(12) United States Patent
Pancou et al.

(10) Patent No.: US 6,964,169 B2
(45) Date of Patent: Nov. 15, 2005

(54) LONG LIFE NOZZLE FLAP FOR AIRCRAFT TURBOJETS

(75) Inventors: Thierry Pancou, Melun (FR); Hervé Barret, Villemoisson (FR); Claude Corbin, Voisenon (FR); Stéphane Blanchard, Chartrettes (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/849,019

(22) Filed: May 20, 2004

(65) Prior Publication Data

US 2005/0005608 A1   Jan. 13, 2005

(30) Foreign Application Priority Data

May 26, 2003  (FR) .................................. 03 50177

(51) Int. Cl.[7] .............................................. F02K 1/12

(52) U.S. Cl. ........................... 60/771; 264/81; 264/136

(58) Field of Search ............. 60/770, 771; 239/265.19, 239/265.33, 365.37, 265.39; 264/81, 136

(56) References Cited

U.S. PATENT DOCUMENTS

| | | | |
|---|---|---|---|
| 4,196,856 A | 4/1980 | James | |
| 4,637,550 A | 1/1987 | Nash | |
| 5,000,386 A | 3/1991 | Lybarger | |
| 5,034,172 A | 7/1991 | Vives et al. | |
| 5,174,368 A | * | 12/1992 | Boury et al. ................. 165/146 |
| 5,553,455 A | * | 9/1996 | Craig et al. ................... 60/753 |

* cited by examiner

*Primary Examiner*—Ehud Gartenberg
(74) *Attorney, Agent, or Firm*—Oblon, Spivak, McClelland, Maier & Neustadt, P.C.

(57) ABSTRACT

The invention proposes a long life nozzle flap for aircraft turbojets. This flap is remarkable in that it is composed of a hollow tapered body (10) flattened in the transverse direction along straight geometric generating lines (11), the body (10) forming a thin wall (12) with an approximately constant thickness E, this wall (12) comprising a continuous inner surface with a radius of curvature equal to at least 2×E, the wall (12) being made of a refractory composite material composed of reinforcing fibers (18) embedded in a matrix also made from a refractory material, the reinforcing fibers (18) being arranged in a plurality of continuous layers of fibers (18) stacked on each other, the fibers (18a) of a layer crossing the fibers (18b) of any adjacent layer.

12 Claims, 8 Drawing Sheets

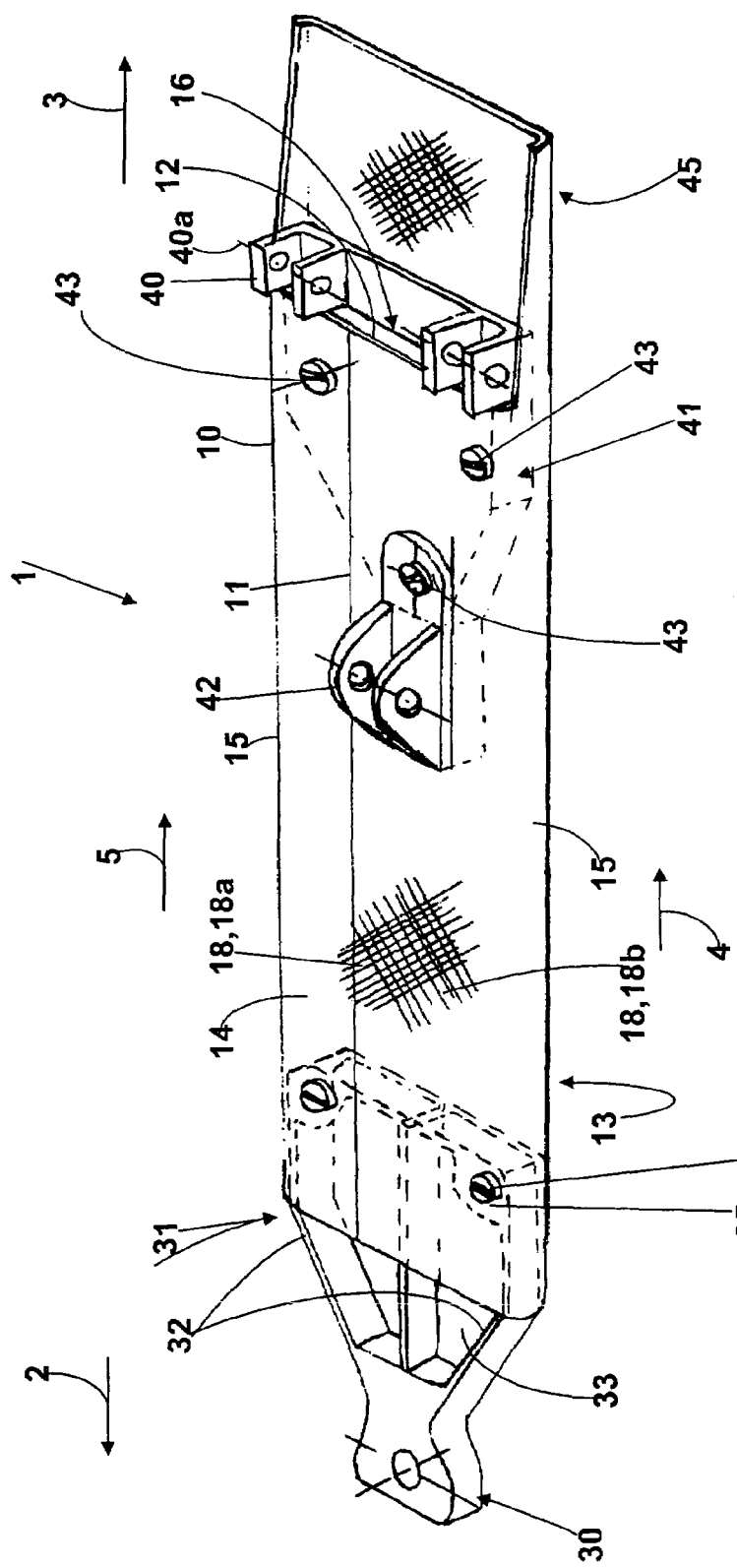
Fig: 1

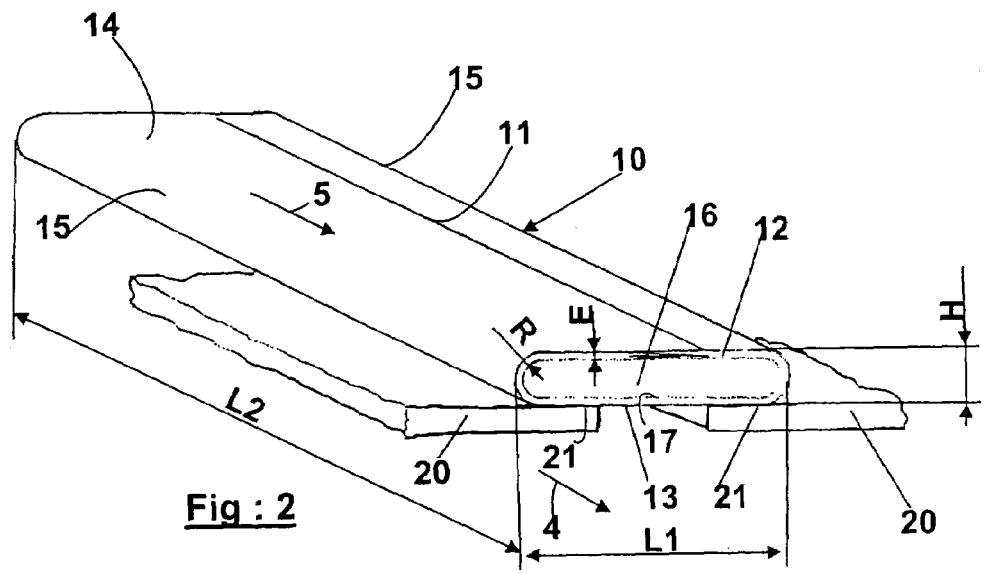
Fig : 2
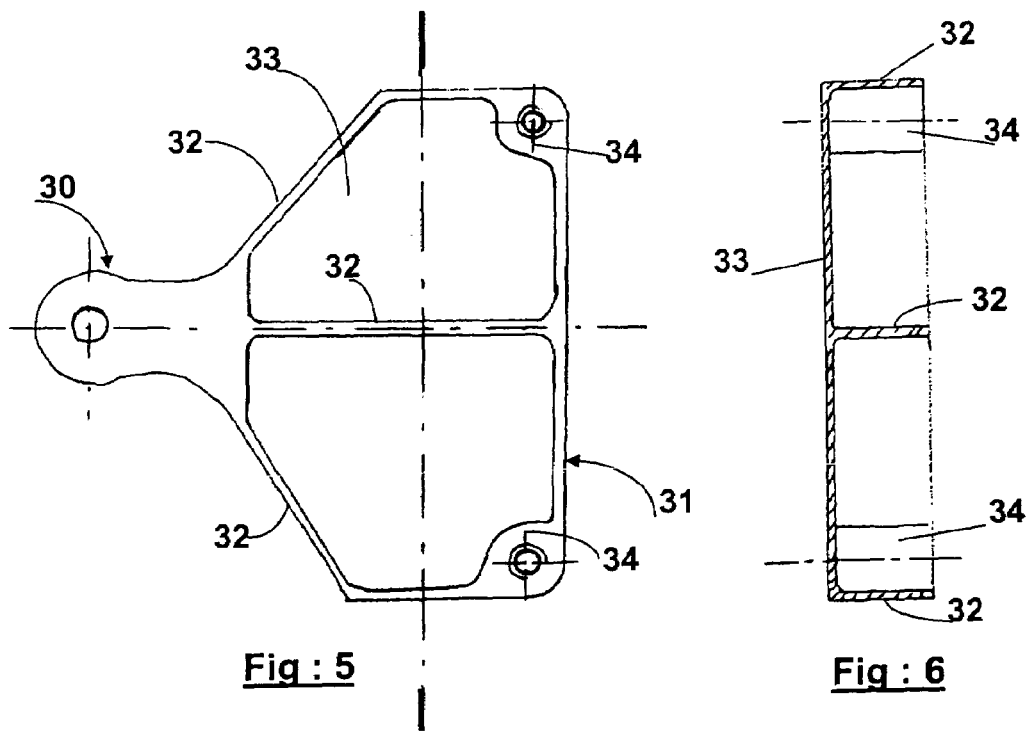
Fig : 5   Fig : 6

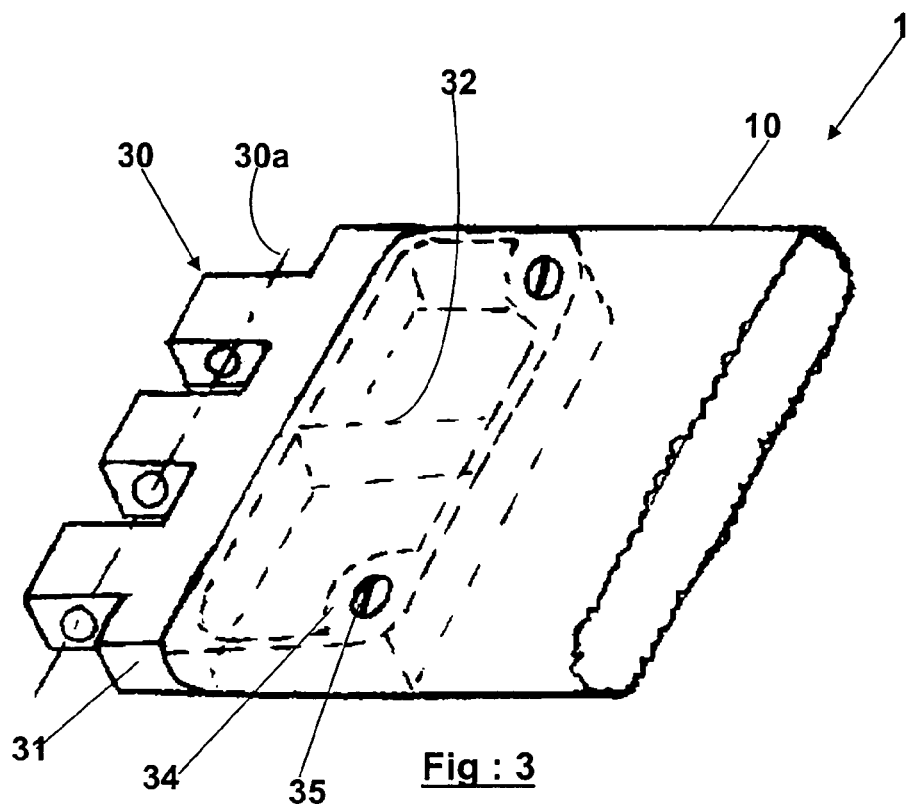
Fig : 3
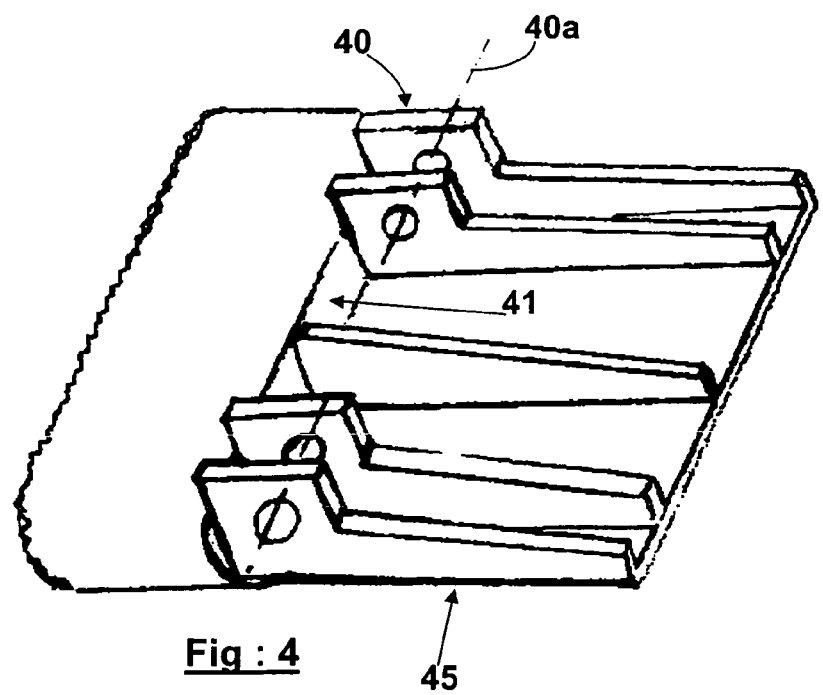
Fig : 4

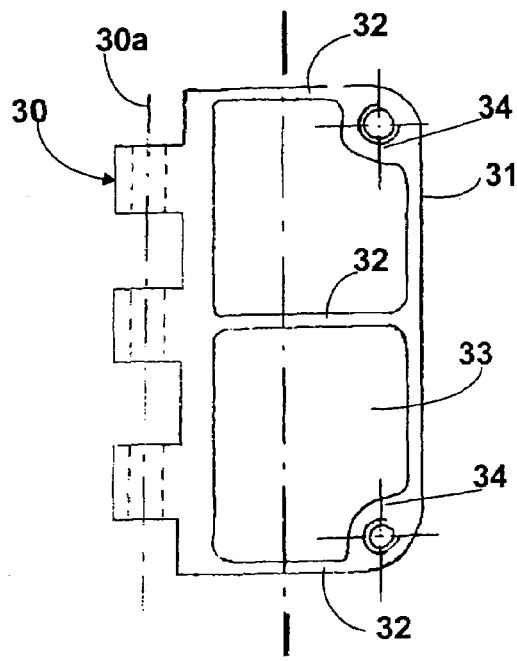
Fig : 7
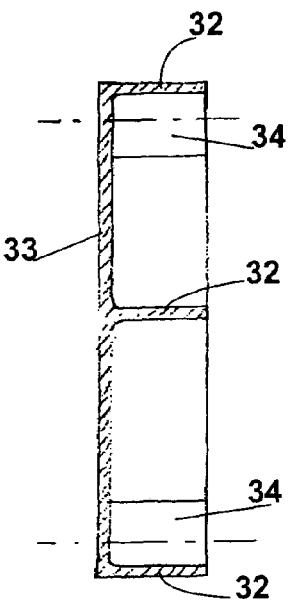
Fig : 8
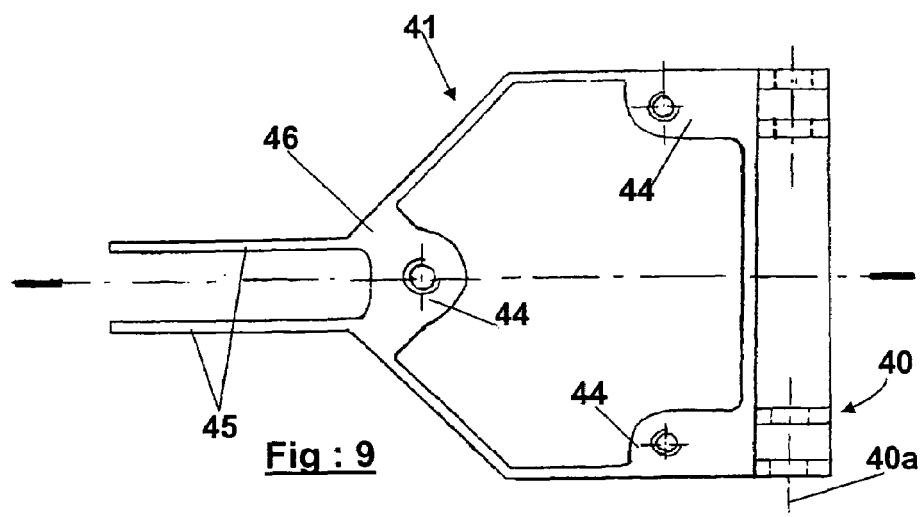
Fig : 9
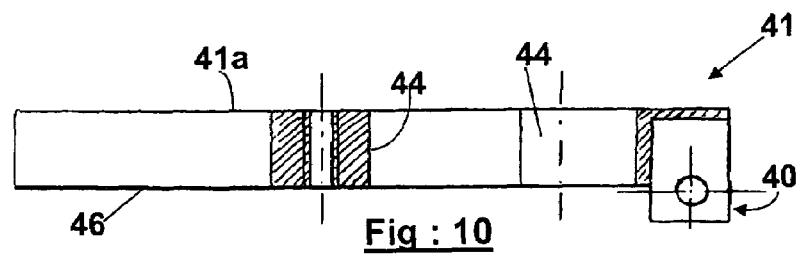
Fig : 10

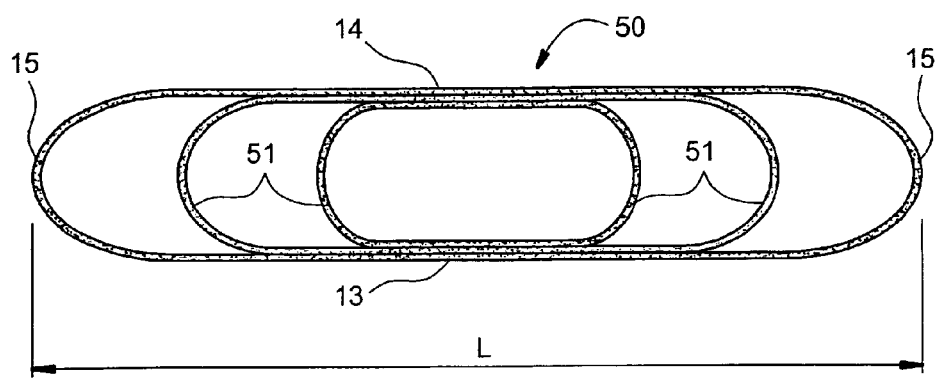
Fig : 11
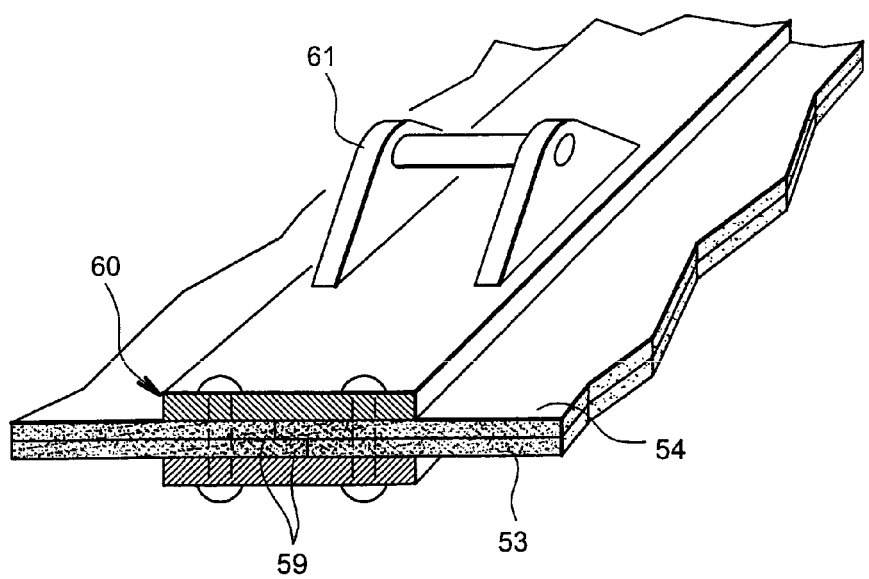
Fig : 13

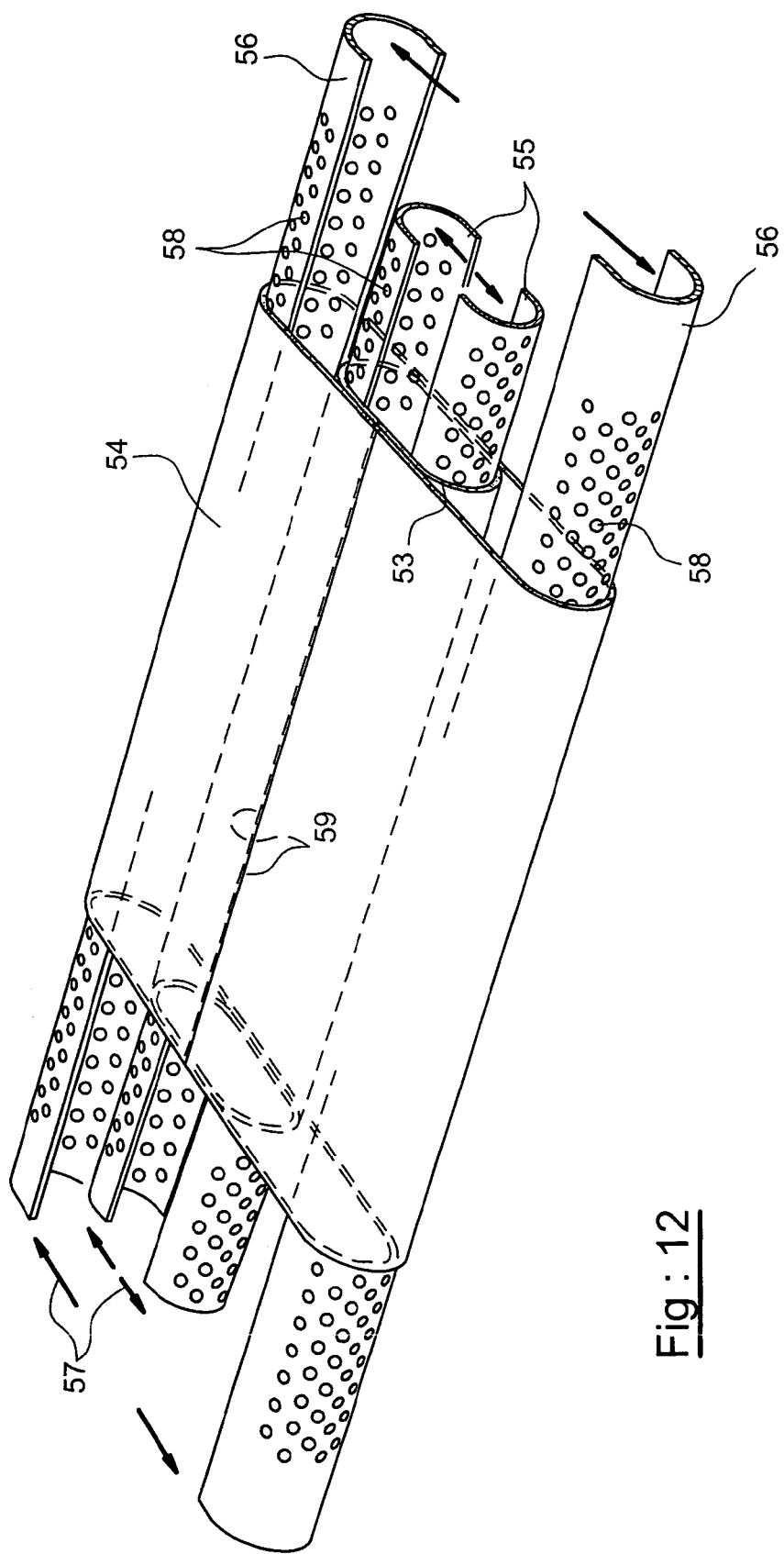
Fig : 12

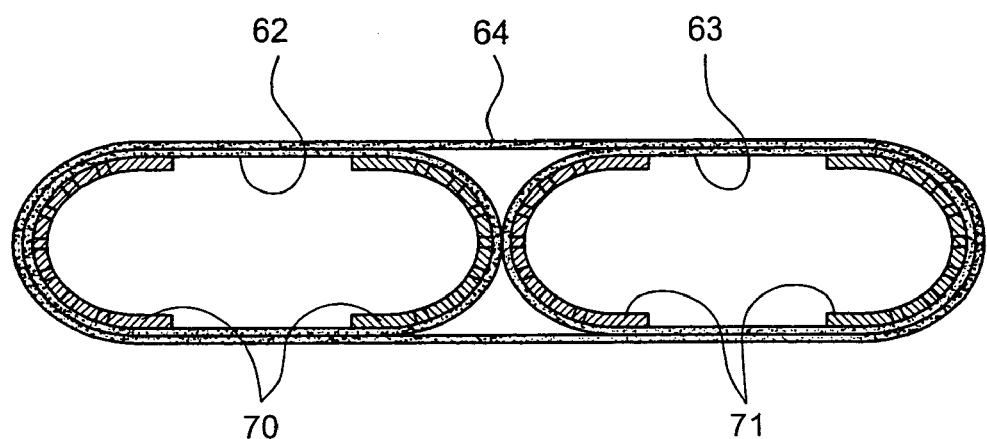
Fig : 14
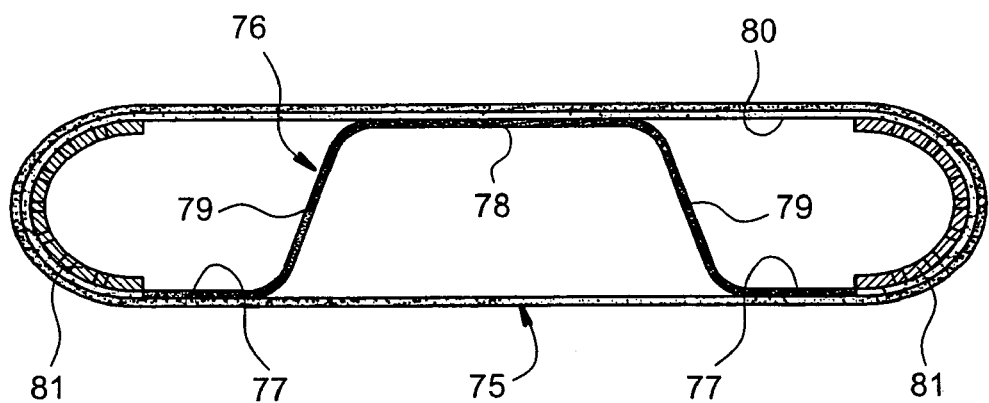
Fig : 15

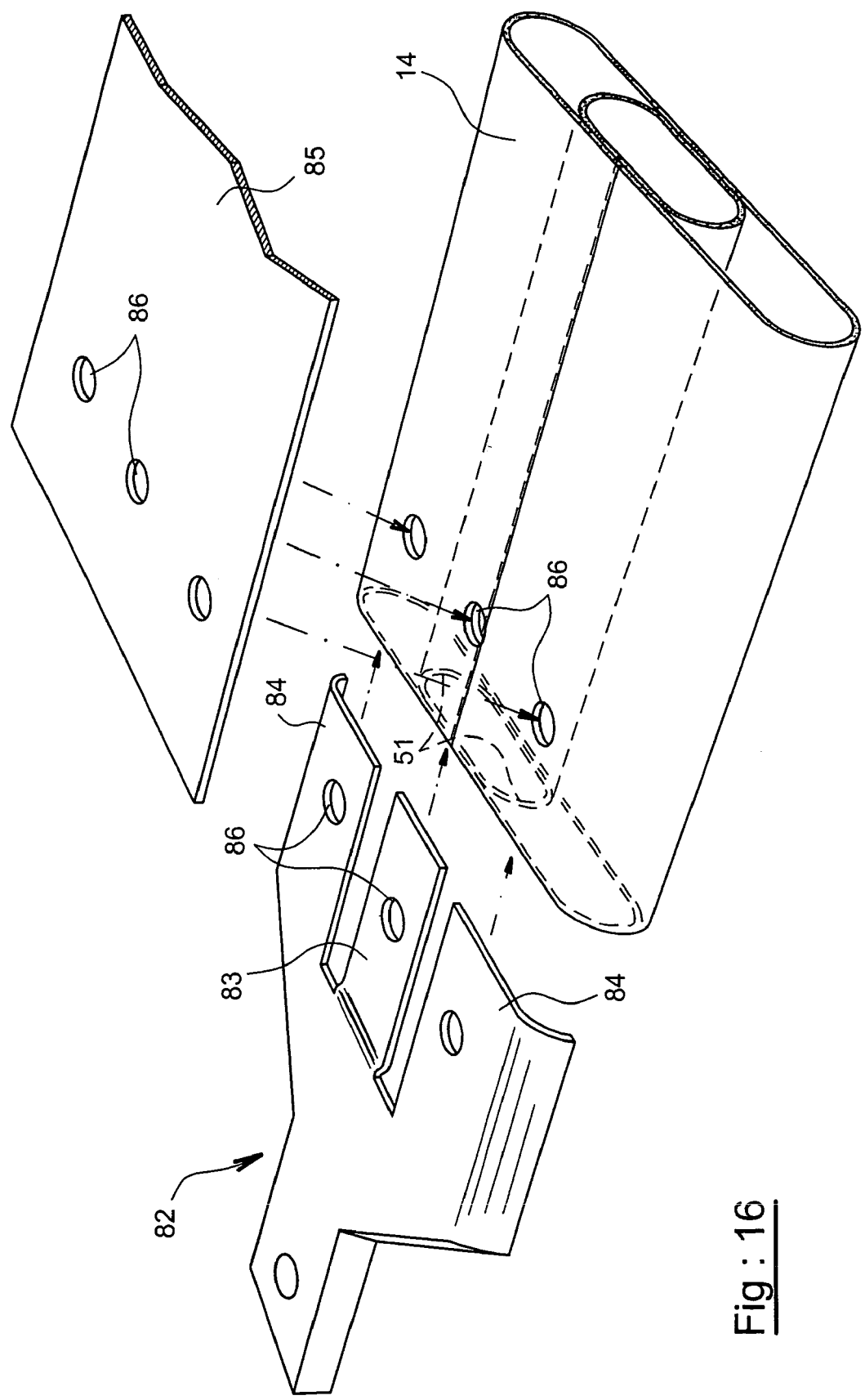
Fig: 16

LONG LIFE NOZZLE FLAP FOR AIRCRAFT TURBOJETS

TECHNICAL DOMAIN

This invention relates to nozzle flaps for aircraft turbojets and more particularly flaps made of refractory composite material.

Variable section nozzles are well known in the aeronautics industry to direct propulsion gas flows as a function of the speed of the turbojets that produce them. In the following, variable section nozzles will simply be referred to as "nozzles".

STATE OF PRIOR ART.

U.S. Pat. No. 5,285,637 clearly describes a sophisticated nozzle model comprising (in order from the front towards the back in sequence) a convergent segment and a divergent segment, this nozzle also being subjected to a "vector" thrust obtained by deviation of the propulsion gas flow. There are simpler nozzles that are limited to a single convergent segment and/or that are asymmetric, in other words they are incapable of deviating the propulsion gas flow. In any case, a nozzle comprises several contiguous flaps to form a variable section channel around the propulsion gases. The structure of a flap is generally a thin rectangular elongated plate articulated at the mechanical element just on the upstream side of it. In some special cases, the shape of the flap may be usually isosceles trapezoid, with the limiting shape being rectangular. In the case of a convergent and divergent nozzle, each flap in the convergent segment is thus articulated on the upstream side to the fixed structure, and also on the downstream side to the flap of the divergent segment which is an extension of it. The "inside" face of the flap, in other words the face facing the inside of the nozzle, is partly or completely in direct contact with the hot propulsion gas flow denoted as the "hot flow" in the following. On the other hand, the opposite "external" face, in other words the face facing the outside of the nozzle, is partly or completely in direct contact with a cold air flow denoted the "cold flow" in the following.

A distinction is made between "controlled" flaps and "sealing" flaps. Controlled flaps are connected to connecting rods that bring them towards or away from the geometric centreline of the nozzle to vary its section. Variable width spaces between controlled flaps are closed off by sealing flaps that are located between controlled flaps and the propulsion gas flow, the sealing flaps being held in contact with flaps controlled by mechanical means and by the pressure of propulsion gases. It can be understood that high mechanical loads are applied to the controlled flaps. During operation, the area of flaps exposed to the hot flow is typically at temperatures of the order of 1000° C. Consequently, nozzle flaps are usually made of a refractory metallic alloy, in other words resisting high temperatures. Nevertheless, their life is still limited.

Some proposed solutions, as in document U.S. Pat. No. 2,770,944, require a double wall construction of nozzle flaps. The above disadvantages are essentially that double wall construction is usually used to circulate cooling air through the gap between them, but large temperature differences remain in the flap despite the resulting cooling.

Known refractory composite materials are composed of refractory fibres embedded in a refractory matrix. The fibres and the matrix may be made of carbon. The fibres and the matrix may also be made of ceramic such as silicon carbide SiC, titanium aluminides, aluminium aluminides, etc. Despite their high mechanical strength and their strength at high temperature, this type of material is not very suitable for manufacturing nozzle flaps since they are very vulnerable to temperature gradients that introduce tension stresses due to their "vitreous" type rupture. A "vitreous" type rupture means that the material breaks suddenly under the effect of a tension stress immediately when this stress exceeds the elastic limit of the material. This vulnerability is aggravated with composite refractory materials that have a high modulus of elasticity or Young's modulus, and are typically at high temperatures.

An attempt is made to make flaps from a refractory composite material in the form of flat thin elongated rectangular plates on which connecting elements made of a refractory metallic alloy are fixed. With this type of flap, the cold face tends to crack under the effect of temperature differences between the hot face and the cold face, expansion of the hot face generating tension stresses on the cold face. In the case of controlled flaps, the temperature at the centre of the flap is higher than the temperature towards its side edges, since the centre of the flap is directly exposed to the hot flow while the side edges are isolated from the hot flow by the sealing flaps. Consequently, expansion of the flap at the centre generates tension stresses on the edges that cause cracking that tends to propagate towards the centre and to break the flap.

The result is that, since refractory composite materials are vulnerable to temperature gradients and these temperature gradients are inevitable in nozzle flaps, attempts to make these parts from these materials have not been very successful. Therefore the problem faced by the inventors was to make nozzle flaps made of refractory composite materials with a genuinely longer life.

PRESENTATION OF THE INVENTION

In order to solve this problem, the invention proposes a nozzle flap that is remarkable in that it is composed of a hollow tapered body flattened in the transverse direction along straight geometric generating lines, the body forming a thin wall with an approximately constant thickness e, this wall being divided transversely into four adjacent parts consisting of a flat "hot" trapezoidal wall and a flat "cold" trapezoidal wall parallel to the hot wall and two symmetric side walls connecting the cold wall and the hot wall laterally, the wall comprising a continuous inner surface with a radius of curvature equal to at least 2×E, the wall being made of a refractory composite material composed of continuous reinforcing fibres made crosswise from a refractory material embedded in a matrix made of another refractory material.

Nozzle flaps with double walls made from composite materials have apparently not been proposed in prior art. The reasons are probably related to the fact that there are also temperature gradients, and there is no reduction in the risk of vitreous rupture; and the difficulty of forming such a nozzle flap with techniques specific to composite materials.

However, it has been found that the presence of lateral walls connected to the edges of the hot wall through rounded edges completely changed the resistance of the flap to thermal loads.

It is expected that flaps according to the invention will have satisfactory resistance to vitreous rupture. Moreover, the poor thermal conductivity of composite materials reduces heat transfers to the cold wall, without cooling by air circulation between the walls being necessary or even useful, since it could increase temperature differences between the two sides of the hot wall.

In one particular embodiment, this flap comprises an articulation element called the "upstream" element at one end fixed to an insert called the "upstream" insert penetrating into the cavity in the flap, the insert being held in place by screws in contact with the cold wall, the cold wall being locally sandwiched between the screw heads and the upstream side insert, the screws passing through the cold wall and screwing into the upstream insert.

In another embodiment that does not exclude the first embodiment, the flap includes an articulation element called the "downstream" element fixed to a "downstream" insert and a connecting rod clevis forced into contact with the cold wall on the outside of the flap, the connecting rod clevis being located on the median part of the flap, the downstream insert being extended on the inside of the flap as far as underneath the connecting rod clevis, the downstream insert being fixed in contact with the cold wall by at least three screws, the heads of which are on the external surface of the flap, the screws passing through the cold wall and screwing into the downstream insert, one of the three screws also passing through the connecting rod clevis and holding it in place in contact with the cold wall.

The thermal insulation provided by the flap also depends on its thickness, in other words the width of the side walls. It is advantageous if these side walls include rounded portions, and also flat portions to give a greater barrier to temperature rises.

The mechanical resistance of the flap must sometimes be reinforced. The flap will then include ribs joining trapezoidal and plane walls through rounded portions with a radius of curvature equal to 2×E. These ribs are also made of a refractory composite material and are only responsible for a small heat loss towards the cold wall.

One important aspect of the invention is the method for manufacturing such a nozzle flap. It includes a step for creating a texture with continuous edges of refractory fibres arranged crosswise, a step for tensioning the texture around rigid and porous sections, opposite each other and curved inwards with convex parts facing towards divergent directions and with radii of curvature equal to at least 2×E where E is the thickness of the texture, and a step for depositing a refractory matrix by vapour phase deposition on the texture and through the sections.

A variant of this method used for manufacturing a ribbed flap like that mentioned above, includes a step to create several textures with continuous edges of refractory fibres arranged crosswise, a step to tension the textures around pairs of rigid and porous sections, opposite each other and curved inwards with convex parts facing towards divergent directions for each wall, sections with radii of curvature equal to at least 2×E where E is the thickness of one of the textures that is tensioned on the section, and a step for the deposition of a refractory matrix by vapour phase deposition on the textures and through the sections, the textures having superposed portions and the matrix being continuous through the said superposed portions.

BRIEF DESCRIPTION OF THE FIGURES

The invention will be better understood and the advantages that it offers will become clearer after reading the details of example embodiments and appended figures.

FIG. 1 illustrates a "controlled" type flap fitted with its connecting elements, FIG. 2 illustrates the bare flap, FIG. 3 illustrates an upstream articulation element of the pivoting type with its insert, FIG. 4 illustrates a downstream articulation element also of the pivoting type with its integrated end piece, FIGS. 5 and 6 show details of a ball joint type upstream articulation element, FIGS. 7 and 8 show details of the upstream pivoting type of articulation element, FIGS. 9 and 10 illustrate details of the downstream articulation element without the integrated end piece, FIG. 11 illustrates a complex nozzle flap, FIG. 12 illustrates a method of manufacturing such a flap, FIG. 13 illustrates a manufacturing embodiment, FIG. 14 illustrates a blank of another complex nozzle flap, FIG. 15 illustrates a blank of another complex nozzle flap, FIG. 16 illustrates an end piece used for a ribbed flap.

DETAILED PRESENTATION OF PARTICULAR EMBODIMENTS

The description refers firstly to both FIGS. 1 and 2. The nozzle flap 1 is in direct contact (from the upstream side 2 to the downstream side 3) on one side with a hot propulsion gas flow 4 and on the other side with a cold gas flow. The flap 1 is composed of a transversely flattened cylindrical body 10, for which a geometric generating line is denoted reference 11. The body 10 consists of a thin monoblock wall 12 with thickness E, in other words a wall made of a single piece. The wall 12 comprises four adjacent parts in pairs along a generating line 11. The first part or hot wall 13 is plane and rectangular. The second part or cold wall 14 is plane and rectangular, and opposite to and parallel to the hot wall 13. The third and the fourth parts are composed of sidewalls 15 and are convex outwards. The internal cavity formed by the wall 12 will be referenced 16, and the inside surface of this wall 12 will be denoted as reference 17. The wall 12 is made of a refractory composite material. Consequently, the material is composed of continuous refractory fibres 18 arranged crosswise embedded in a matrix that is also refractory. With this type of material, the radius of curvature R of the inside surface 17 must be equal to at least twice the thickness E of the wall 12 in order to prevent delamination of the fibre layers 18 under stress, in other words separation of the different layers due to rupture of the matrix. Consequently, the height H of the flap is equal to at least six times the thickness E of the wall. This type of structure enables thin flaps for which the width L1 is equal to at least five times the height H.

Some of the fibres 18a are globally parallel to each other. In this example, the fibres 18 are inclined at 45° with respect to the generating lines 11. This configuration is used particularly for a short body 12. In the case of a long body 12, it is preferable to arrange part of the fibres 18a parallel to the generating lines 11 and the other part of the fibres 18b perpendicular to the generating lines 18b in order to improve the bending strength. In all cases, a sufficient number of layers must be provided with fibres 18 surrounding the body 10 transverse to the generating lines 11. In practice, half of the fibres 18a crosses the other half of the fibres 18b at 90°. The body 10 is made using techniques well known to those skilled in the art. Fibres may be put into position by crosswise winding of the fibres onto a mandrel or by applying a fabric of loose fibres. The fabric of fibres may be a conventional laying. The strength of the flap may advantageously be improved using a multi-layer fabric, for example a "2.5D" fabric divulged by American patent U.S. Pat. No. 5,899,241, in priority over French patent FR 2 759 096.

Refer more particularly to FIG. 2. During operation, the hot wall 13 is at least partly in direct contact with a hot propulsion gas flow while the cold wall 14 opposite the hot wall 13 is in direct contact with a cold flow 5. Therefore, the hot wall 13 expands with respect to the cold wall 14, but the tension force that is thus transmitted to the cold wall 14 transverse to the generating lines 11 is attenuated by deformation of the sidewalls 15 that therefore resists part of this force.

Two sealing flaps 20 are shown in this example, that come into contact with the hot wall 13 close to the sidewalls 15. Thus, contact areas 21 of the hot wall 13 with sealing flaps 20 and the sidewalls 15 are not in direct contact with the hot flow 4 and thus are therefore colder. However, unlike a single plate, the tension stresses in the direction of the generating lines 11 imposed on the hot wall in contact areas 21 are reduced by the presence of sidewalls 15 that oppose this expansion and therefore resist part of the tension force produced. In other words, tension stresses are distributed in contact areas 21 and in sidewalls 15, which reduces their maximum values.

Therefore, this type of flap significantly reduces tension stresses caused by temperature gradients, which enables the use of refractory composite materials with vitreous rupture such as those mentioned above, which solves the problem that arises.

The flap according to the invention has the advantage of being lighter weight than its equivalent in the form of a plate made of a refractory composite material. A flap made of a 7 mm thick solid plate can be replaced by a flap according to the invention with a wall only 2 mm thick, for a bending strength ten times higher, therefore the total thickness of the hot wall 14 and the cold wall 15 being 2 mm+2 mm=4 mm.

The flap according to the invention also has the advantage that it provides a means of reducing the infrared signature of the nozzle in two ways. Firstly, the cold wall 14 is better thermally insulated from the hot wall 13 due to the hollow structure of the flap.

Refer once again to FIG. 1. The flap 1 is equipped near the upstream side 2 by an upstream articulation element 30 of the ball joint type fixed to an upstream insert 31 composed of three ribs that are higher than they are wide, a wall 33 transversely connecting the ribs 32 to each other and providing lateral stiffness, and two bosses 34. An articulation element means the part of the articulation that remains fixed to the flap when the articulation is disassembled. The upstream articulation element 30, the upstream insert 31 and its constituents thus defined form a monoblock, or single-piece, assembly. The upstream insert 31 is deposited in the internal cavity 16 on the upstream side 2 of flap 1. The upstream insert 31 is placed in the internal cavity 16 on the upstream side 2 of flap 1. The upstream insert 31 is kept in contact with the cold wall 14 through two screws 35, for which the head is outside the flap 1, these screws 35 passing through the cold wall 14 and screwing into the bosses 34. In other words, the cold wall 14 is locally sandwiched between the screws heads 35 and the insert. The screws 35 are advantageously separated such that each is held in position close to a sidewall 15 so that the cold wall is not subjected to bending stresses transverse to the generating lines 11, the forces being resisted by the corner formed by the cold wall 14 adjacent to the sidewall 15 at this location and by this sidewall 15.

The flap 1 is also equipped with a downstream articulation element 40 of the pivoting type connected to a downstream insert 41 forming a single-piece assembly with it. The downstream articulation element 40 is offset on the outside of the flap on the side of the cold wall 14. The downstream articulation element 40 enables pivoting according to a geometric axis 40a perpendicular to the generating lines 11, parallel to the cold wall 14 and approximately in line with this cold wall 14. The flap 1 is also equipped with a connecting rod clevis 42 applied in contact with the cold wall 14 at the outside of the flap 1, the connecting rod clevis 42 being located on the median part of the flap 1 at equal distances from the sidewalls 15.

The downstream insert 41 is prolonged on the inside of the flap 1 as far as underneath the connecting rod clevis 42. The downstream insert 41 is fixed in contact with the cold wall 14 by three screws 43, for which the head is on the outside of the flap 1, the screws passing through the cold wall 14 and each screwing into a boss 44 of the downstream insert 41. Two of the three screws 43 are close to the downstream articulation element 40 and are separated from each other so that each is positioned close to a sidewall, for reasons already mentioned in the case of the screws 35 fixing the upstream insert 31. The third screw 43 also passes through the connecting rod clevis 42 to keep it in contact with the cold wall 14. It can be understood that the connecting rod clevis 42 enables the flap 1 to be manoeuvred through a connecting rod, not shown, during operation.

The downstream insert 41 is also prolonged towards the upstream side 2 by a fork 45, for which the branches pass under the connecting rod clevis 42 to prevent the cold wall 14 from bending under the force transmitted by the connecting rod clevis 42 to the cold wall 14, the fork 45 thus resisting this force. The surface of the downstream insert 41 marked as reference 46 in FIG. 9 is in contact with the cold wall 14 with a complementary shape, and therefore plane in practice.

Also in this example, the flap 1 is prolonged towards the downstream direction 3 by an end piece 45 that is an extension of the wall 12 and more precisely of the hot wall 13 and the sidewalls 15, this extension always being along the generating lines 11. During operation, the downstream end piece 45 directs the hot flow 4 further towards the downstream direction 3 and thus protects the downstream articulation element 40 since the downstream end piece 45 passes between the downstream articulation element 40 and the hot flow 4. This invention has the advantage of completely isolating the attachment screws 35, 43 from the hot flow 4 during operation, since the hot wall 13 passes between the screws and the hot flow, these screws necessarily being metallic. Refer to FIG. 3 for an example of an upstream articulation element 30 that in this case pivots about a geometric axis 30a perpendicular to the generating lines 11, parallel to the hot and cold walls 13, 14 and at mid-distances from the generating lines 11 defining the hot and cold walls 13, 14. This Figure also shows the upstream insert 31 inserted in the flap 1 and fixed in contact with the cold wall 14 by two screws 35.

Refer to FIG. 4 for an example of a downstream end piece 45, in this case composed of the downstream extension 3 of the downstream insert 41. The downstream end piece 45 is stiffened by plane ribs 50 perpendicular to the geometric pivoting axis 40a, the upstream part of these ribs 50 being perforated along the geometric pivoting axis 40a and thus forming the downstream articulation element 40.

Refer to FIGS. 5 and 6 for a more precise view of the composition of the articulation element 30 of the ball joint type and the upstream insert 31. Refer to FIGS. 7 and 8 to see these same constituents in the case of a pivoting type articulation element 30 pivoting about the geometric axis 30a.

Finally, refer to FIGS. 9 and 10 for a more precise view of the downstream insert 41 and the downstream articulation element 40. In some uses, the flap 1 may have a more generally flattened tapered shape, the hot wall 13 and the cold wall 14 then being trapezoidal, preferably but not necessarily isosceles, the sidewalls 15 then no longer being parallel. The upstream and downstream inserts 31, 41 may be drilled to allow a cold air flow to pass inside the flap.

Thus, the flap 1 as described above has some disadvantages due to the large lateral extension of the cold wall 14 and particularly the hot wall 13. The gas pressure applied to the hot wall may sometimes cause deformations that increase bending and shear stresses between laminations at the rounded edges of the hot wall 13, and vibrations. The nozzle flap illustrated in FIG. 11 reduces these disadvantages. It is denoted reference 50, and is different from the previous nozzle flap by the presence of ribs 51 joining the cold wall 14 to the hot wall 13 between the sidewalls 15. In this case, there are four of these ribs 51. Their elongation direction is essentially the same as for the sidewalls 15. They. are also made like the sidewalls 15, with rounded edges 52 with an inside radius of curvature equal to at least twice the thickness. Once again, intolerable stresses are avoided at the junctions of the hot wall 13.

The method of making such a nozzle flap is shown in detail using FIG. 12 for a flap with only one pair of ribs 51; this simpler configuration was chosen to avoid complicating the drawing excessively, but obviously the method could be applied to the embodiment in FIG. 11 or to the other embodiments described later.

The walls of the flap 50 are firstly materialised by textures composed of a crosswise arrangement of refractory fibres. In this case there are two of these textures, one 53 being arranged inside the other 54. Furthermore, a pair of tensioning sections is associated with each of the textures 53 and 54 to tension them so as to form plane areas between the sections, which will form the hot and cold walls. The tensioning sections of the texture 53 are marked as reference 55, and the tensioning sections of the texture 54 are marked as reference 56. The sections 55 and 56 of each pair face each other and their sections are curved at the convex part facing outwards, so that the textures 53 and 54 are in the same shape as the sidewalls 15 and ribs 51, rounded at least at their edges. The spacing between section walls 55 and 56 is kept constant by spacers 57 that may have any nature. Finally, the sections 55 and 56 are perforated or are porous, with the pores being marked as reference 58. The pairs of sections 55 and 56 are arranged symmetrically to a common plane.

Therefore, the textures 53 and 54 are in the shape of a flattened sleeve. They touch each other through their plane faces between the tensioning sections 55 and 56. Note that in practice they are formed from fibre sheets that are folded and joined together by their opposite edges. The joint lines 59 thus obtained can be sewn or stapled. They can also be pressed between opposite elements of a metallic fitting 60 that advantageously supports a control connecting rod clevis 61, shown in FIG. 13. Finally, joint lines 59 may be adjacent or opposite. Better cohesion can be obtained by sewing or stapling the textures 53 and 54 together where they touch, although this is not necessary. In all variants, the composite material is created by depositing the matrix material on the textures 53 and 54 by vapour phase deposition. The matrix material gradually penetrates into the fibre network of textures 53 and 54 also passing through the pores 58, preventing the tensioning sections 55 and 56 from weakening the sidewalls 15 and the ribs 51 by stopping the deposition material. After this densification step, the composite may be hardened by heating it in a furnace. The same method is applied to making flaps without ribs, a single texture and a single wall of tensioning section being used.

Therefore, the tensioning sections 55 and 56 define the shape of the sidewalls 15 and ribs 51, including at the rounded edges. Superposition of textures on part of the extent of their plane portions makes the hot and cold walls 13 and 14 thicker at the centre. This greater thickness reinforces the flap 50 against bending around the tangential direction. It has the disadvantage that deposition of the matrix material is more difficult at the centre of the stack of textures, but it can be done by gradual migration made by several densification steps.

Another configuration is described with reference to FIG. 14. Two pairs of tensioning sections 70 and 71 are used for three textures 62, 63 and 64, in which the last texture surrounds the other two that are side by side. The sections 70 tension the texture 62, and the sections 71 tension the texture 63. Moreover, the extreme sections 70 and 71 of the alignment also tension the texture 64, and the two intermediate sections 60 and 61 facing each other make the internal ends of textures 62 and 63 touch each other. The same manufacturing method will result in a nozzle flap with a particularly strong central rib, since it will attach the hot and cold walls by pairs of rounded edges.

Another type of embodiment is shown in FIG. 15; the nozzle flap will essentially be formed from a first texture 75, with a shape similar to the texture 54 for example, and an internal undulating texture 76 with two ribs 77 on the sides of the hot wall 13, a strip 78 under the centre of the cold wall 14, and two oblique ribs 79 joining the strip 78 to the ribs 77. The internal texture 76 may be stressed and densified partially separately to make it rigid before the first texture 75 is wound around it.

A third texture 80, extending along the sidewalls 15 and the cold wall 14 from one rib 77 to the other, can complete the structure of the flap and reinforce the cold wall 14. It may or may not be sewn to the internal texture 76. The textures 75, 76 and 80 are then densified to form the nozzle flap in the same way as for other embodiments, using a pair of tensioning sections 81 at the ends that are similar to the tensioning sections 56.

FIG. 16 illustrates a method of finishing a ribbed nozzle flap, like that in FIG. 12 for example, used for finishing mechanical connecting parts. The upstream insert 82 inserted in the flap itself is shaped like a fork and includes a central tooth 83 engaged between the two ribs 51 and two side teeth 84 engaged between the ribs 51 and the sidewalls 15, and between the side walls. The cold wall 14 is sandwiched between a plate 85 fixed to the upstream insert and the teeth 83 and 84. All these elements are provided with drillings 86 for the passage of tightening screws, not shown, that clamp the assembly together.

The nozzle flaps may include radii of curvature that may be smaller or larger within the limit indicated herein. Small radii of curvature are usually preferred.

For a hot wall 13 with a determined length plane part, the sealing flaps 20 cover a narrower part of the hot wall 13 if the sidewalls 15 have small filet radii, and the thermal gradients of the hot wall 13 are low; and the nozzle flaps may be brought closer to each other when the nozzle is in the closed state because they are narrower; closing can be better.

However, a sufficient distance must be maintained between the hot and cold walls 13 and 14 to limit heat transfers, such that the sidewalls 15 are usually in a plane position with a certain width, if the radii of curvature of the rounded parts are small. Thus, all the previous embodiments can be built from the example of the flaps in FIG. 1 (small radii of curvature) or FIG. 11 (large radius of curvature).

A particular arrangement of the nozzle flaps includes metallic parts attached to the cold wall 14 and made of titanium. This metal is appreciated for its lightweight in aeronautics and elsewhere, but it is not very resistant to heat. However, with the invention, temperature differences of 400° C. can be obtained between the hot and cold walls 13 and 14 (for example at 1000° C. and 600° C.) which justifies its use for fitting 60, clevis 61, etc.

What is claimed is:

1. Nozzle flap for aircraft turbojet, characterised in that it is composed of a hollow tapered body (10) flattened in the transverse direction along straight geometric generating lines (11), the body (10) forming a thin wall (12) with an approximately constant thickness E, this wall (12) being divided transversely into four adjacent parts namely:
   a plane "hot" trapezoidal wall (13);
   a flat "cold" trapezoidal wall (14) parallel to the hot wall (13) and two symmetric side walls (15) connecting the cold wall (13) and the hot wall (14) laterally;
   the wall (12) comprising a continuous inner surface (17) with a radius of curvature equal to at least 2×E, the wall (12) being made of a refractory composite material composed of continuous reinforcing fibres (18) made crosswise from a refractory material, the reinforcing fibres (18) being embedded in a matrix made of another refractory material.

2. Flap according to claim 1, characterised in that it comprises an articulation element (30) called the "upstream" element at one end fixed to an insert (31) called the "upstream" insert penetrating into the cavity (16) in the flap 1, the insert (31) being held in place by screws (35) in contact with the cold wall (14), the cold wall (14) being locally sandwiched between the screw heads (35) and the upstream side insert (31), the screws (35) passing through the cold wall (14) and screwing into the upstream insert (31).

3. Flap according to claim 1, characterised in that it includes an articulation element (40) called the "downstream" element fixed to a "downstream" insert (41) and a connecting rod clevis (42) forced into contact with the cold wall (14) on the outside of the flap (1), the connecting rod clevis (42) being located on the median part of the flap (1), the downstream insert (41) being extended on the inside of the flap (1) as far as underneath the median part of the flap (1) as far as underneath the connecting rod clevis (42), the downstream insert (41) being fixed in contact with the cold wall (14) by at least three screws (43), the head of which is on the external surface of the flap (1), the screws (43) passing through the cold wall (14) and screwing into the downstream insert (41), one of the three screws (43) also passing through the connecting rod clevis (42) and holding it in place in contact with the cold wall (14).

4. Flap according to claim 1, characterised in that the side walls (15) include flat portions connected to trapezoidal and flat walls (13, 14) through rounded portions with a radius of curvature equal to at least 2×E on the inner surface (17).

5. Flap according to claim 1, characterised in that it includes ribs joining trapezoidal and plane walls (13, 14) essentially parallel to the side walls and connected to trapezoidal and plane walls through rounded portions with a radius of curvature equal to at least 2×E on an inner surface (17).

6. Flap according to claim 5, characterised in that the thickness of the trapezoidal and plane walls increases from the side walls towards a central strip.

7. Method for manufacturing a nozzle flap, including a step for creating a texture with continuous edges of refractory fibres arranged crosswise, a step for tensioning the texture around rigid and porous sections, opposite each other and curved inwards with convex parts facing towards divergent directions and with radii of curvature equal to at least 2×E, where E is the thickness of the texture, and a step for depositing a refractory matrix by vapour phase deposition on the texture and through the sections.

8. Method for manufacturing a nozzle flap including a step to create a plurality of textures (53, 54, 62, 63, 64) with continuous edges of refractory fibres arranged crosswise, a step to tension the textures around pairs of rigid and porous sections (55, 56, 70, 71), opposite each other and curved inwards with convex parts facing towards divergent directions for each pair, the sections having radii of curvature equal to at least 2×E, where E is the thickness of one of the textures that is tensioned on the sections, and a step for the deposition of a refractory matrix by vapour phase deposition on the textures and through the sections, the textures having superposed portions and the matrix being continuous through the said superposed portions.

9. Manufacturing method according to claim 8, characterised in that the pairs of sections are arranged symmetrically to a common plane, and the superposed sections of textures are flat and located between pairs of sections.

10. Manufacturing method according to claim 8, characterised in that it includes a step for binding textures to each other and to the superposed portions before the vapour phase deposition.

11. Manufacturing method according to claim 7, characterised in that the texture is made continuous by folding a sheet of crosswise fibres, joining the two opposite edges of the sheet and fixing the said two edges together by a connection fitting (60).

12. Manufacturing method according to claim 8, characterised in that the textures are made continuous by folding a sheet of crosswise fibres, joining the two opposite edges of the sheet and fixing the said two edges together by a connection fitting (60).

* * * * *